United States Patent
Bronnert

(10) Patent No.: US 7,600,914 B2
(45) Date of Patent: Oct. 13, 2009

(54) RTD SENSOR CONNECTOR SEAL

(76) Inventor: Herve' X. Bronnert, 21495 Partridge Ct., Brookfield, WI (US) 53005

( * ) Notice: Subject to any disclaimer, the term of this patent is extended or adjusted under 35 U.S.C. 154(b) by 861 days.

(21) Appl. No.: 11/293,435

(22) Filed: Dec. 2, 2005

(65) Prior Publication Data
US 2007/0127552 A1 Jun. 7, 2007

(51) Int. Cl.
*G01K 1/00* (2006.01)
*G01K 7/00* (2006.01)

(52) U.S. Cl. .................. 374/208; 374/183; 374/163; 374/185

(58) Field of Classification Search ............ 374/208, 374/183, 163, 185
See application file for complete search history.

(56) References Cited

U.S. PATENT DOCUMENTS

| | | | | |
|---|---|---|---|---|
| 2,828,351 | A | * | 3/1958 | Rade ................. 429/166 |
| 3,100,330 | A | * | 8/1963 | Rice et al. ............... 29/25.42 |
| 3,163,703 | A | * | 12/1964 | McLoad ................ 174/11 R |
| 3,243,500 | A | * | 3/1966 | Rabinowitz .............. 174/84 R |
| 3,818,118 | A | * | 6/1974 | Bennett et al. ............ 174/527 |
| 4,266,992 | A | * | 5/1981 | Agaisse ................ 156/49 |
| 4,575,705 | A | * | 3/1986 | Gotcher ................ 338/28 |
| 4,586,246 | A | | 5/1986 | Oskoui |
| 4,929,092 | A | | 5/1990 | Taguchi et al. |
| 5,152,049 | A | | 10/1992 | McQueen |
| 5,201,223 | A | | 4/1993 | McQueen |
| 5,619,546 | A | | 4/1997 | Porter et al. |
| 5,664,885 | A | | 9/1997 | Buntin et al. |
| 5,741,074 | A | | 4/1998 | Wang et al. |
| 5,831,511 | A | | 11/1998 | Manning et al. |
| 5,864,282 | A | * | 1/1999 | Hannigan et al. ............ 338/30 |
| 5,998,736 | A | * | 12/1999 | Rumsey ................ 174/84 R |
| 6,666,578 | B2 | | 12/2003 | Gibbs et al. |
| 2005/0227526 | A1 | * | 10/2005 | Hopper ................ 439/302 |

OTHER PUBLICATIONS

National Instruments™, "Measuring Temperature with an RTD or Thermistor", Application Note 046, Apr. 2003 (8 pgs.).

* cited by examiner

*Primary Examiner*—Gail Verbitsky
*Assistant Examiner*—Mirellys Jagan
(74) *Attorney, Agent, or Firm*—Foley & Lardner LLP

(57) ABSTRACT

An RTD connector seal to couple and seal an RTD device to an RTD cable. The RTD connector seal includes a tubular sleeve defining an groove in an interior surface proximate each end of the sleeve. The RTD connector seal includes a pair of end plugs, each end plug defining a first channel configured to receive an O-ring and a second channel configured to receive stacked O-rings, with one O-ring aligned with the groove in the sleeve, each end plug defining a through hole configured to receive one of the RTD device and RTD cable. The RTD connector seal includes a terminal plate coupled to each end plug and configured to slidingly engage the interior surface of the sleeve. The RTD connector seal includes a terminal block mounted on the terminal plate, wherein the RTD device is coupled to the RTD cable on the terminal block sealed within the sleeve.

20 Claims, 2 Drawing Sheets

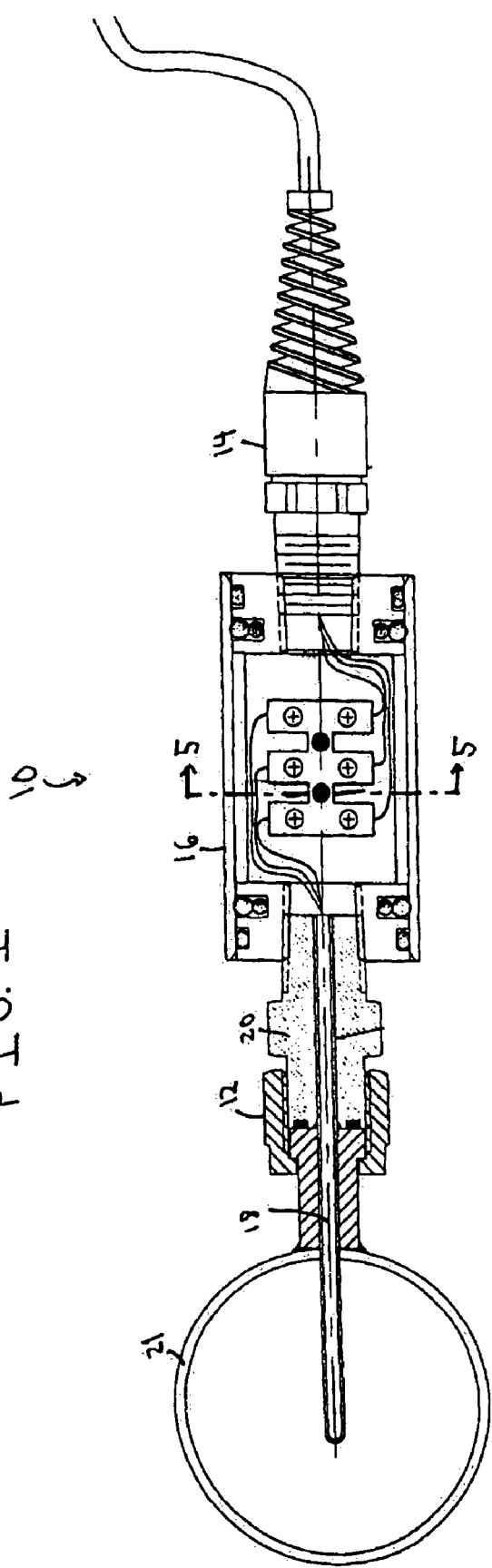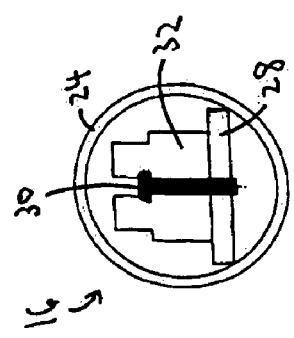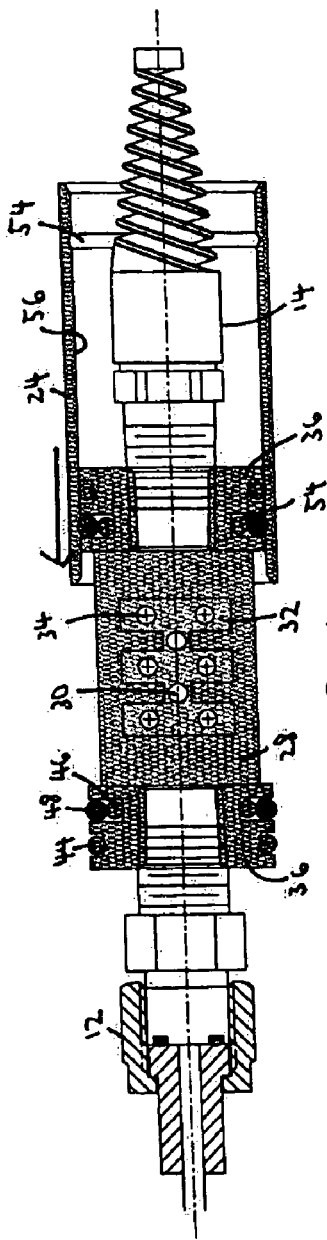

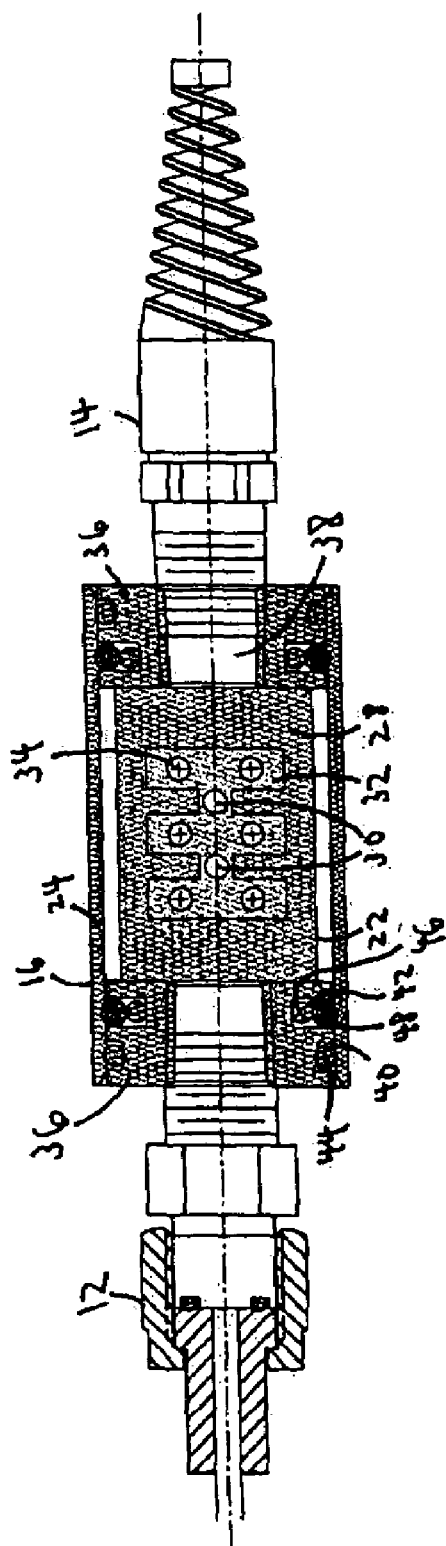
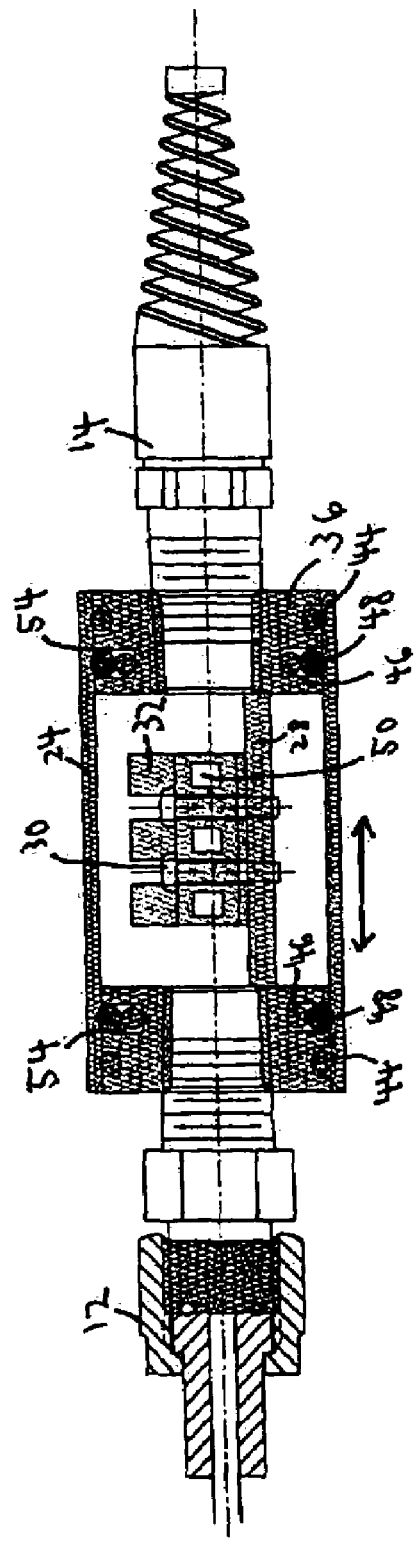

RTD SENSOR CONNECTOR SEAL

FIELD OF INVENTION

The present invention relates generally to the field of resistance temperature detectors (RTDs), and more particularly to a fluidly sealed connector for a RTD device and RDT cable.

BACKGROUND OF THE INVENTION

RTDs are well known for measuring temperature based on their coefficients of resistivity. RTDs operate on the principle of changes in electrical resistance of pure metals and are characterized by a linear positive change in resistance with temperature. When heated, the resistance of the metal increases; when cooled, the resistance decreases. Passing current through an RTD generates a voltage across the RTD. By measuring this voltage, you determine its resistance, and thus its temperature. Typical elements used for RTDs include nickel (Ni) and copper (Cu), but platinum (Pt) is by far the most common because of its wide temperature range, accuracy, and stability. RTDs are popular because of their excellent stability, and exhibit the most linear signal with respect to temperature of any electronic temperature sensor.

RTDs are typically constructed by one of two different manufacturing configurations. Wire-wound RTDs are constructed by winding a thin wire into a coil. A more common configuration is the thin-film element, which consists of a very thin layer of metal laid out on a plastic or ceramic substrate. Thin-film elements are cheaper and more widely available because they can achieve higher nominal resistances with less platinum. To protect the RTD, a metal sheath encloses the RTD element and the lead wires connected to it. Such metal sheaths as are currently known in the art, however, when submerged in a fluid such as water for up to 24 hours, for example, are not capable providing an adequate seal around the element and wires without a leak.

Thus there is a need for an RTD connector seal to couple and seal an RTD element to an RTD cable so that the RTD connector seal is capable of remaining submerged in a medium for a period of time while obtaining temperature data. There is also a need for a method of connecting an RTD element to an RTD cable in an RTD junction box so that the RTD element, cable, and junction box are capable of remaining submerged in a medium for a period of time while obtaining temperature data.

SUMMARY OF THE INVENTION

One embodiment of the invention relates to an RTD connector seal to couple and seal an RTD device to an RTD cable. The RTD connector seal comprises a tubular sleeve defining an annular groove in an interior surface proximate each end of the sleeve. The RTD connector seal further comprises a pair of end plugs, each end plug defining a first annular channel configured to receive an O-ring and a second annular channel configured to receive stacked O-rings, with one O-ring aligned with the annular groove in the sleeve, each end plug further defining a through hole configured to receive one of the RTD device and RTD cable. The RTD connector seal further comprises a terminal plate coupled to each end plug and configured to slidingly engage the interior surface of the sleeve. The RTD connector seal further comprises a terminal block mounted on the terminal plate, wherein the RTD device is coupled to the RTD cable on the terminal block sealed within the sleeve.

Another embodiment of the invention relates to an apparatus to fluidly seal a terminal connection of an RTD device and an RTD cable. The apparatus comprises a tubular sleeve including an interior surface, the sleeve having a first end and a second end, and a groove defined in the interior surface proximate each of the first and second ends. The apparatus further comprises a first plug disposed in the first end and a second plug disposed in the second end, with each plug configured to support a plurality of seals, wherein at least one seal on each plug engages the groove at each respective end of the sleeve and at least one seal on each plug fluidly seals the plug against the interior surface of the sleeve. The apparatus further comprises a terminal member disposed inside the sleeve between and coupled to the first and second plug and in contact with the interior surface of the sleeve, with the terminal member configured to couple the RTD device and the RTD cable together, wherein the terminal member guides the sleeve as the sleeve moves to expose the terminal member.

Another embodiment of the invention relates to a method of connecting an RTD device to an RTD cable in a RTD junction box, the junction box including a slidable sleeve and a terminal member, for submersion in a fluid. The method comprises the step of coupling the RTD device to the junction box. The method further comprises the step of coupling the RTD cable to the junction box. The method further comprises the step of moving the slidable sleeve from a first position to a second position indexed by an O-ring inserting into an annular groove defined in an interior surface of the sleeve, wherein the terminal member is exposed. The method further comprises the step of attaching the RTD device and RTD cable to each other on the terminal member. The method further comprises the step of moving the slidable sleeve to the first position indexed by the O-ring inserting into another annular groove defined a spaced distance from the other annular groove in the interior surface of the sleeve, wherein at least two other O-rings fluidly seal the terminal member inside the sleeve

BRIEF DESCRIPTION OF THE DRAWINGS

FIG. 1 is a top partial cross-section of a resistance temperature detector and cable coupled in a junction box according to one example embodiment.

FIG. 2 is top cross-section of the junction box of FIG. 1 with the sleeve of the junction box in a closed position according to one example embodiment.

FIG. 3 is a side cross-section of the junction box of FIG. 1 with the sleeve of the junction box in a closed position according to one example embodiment.

FIG. 4 is a top cross-section of the junction box of FIG. 1 with the sleeve of the junction box in a an open position according to one example embodiment.

FIG. 5 is an end view cross-section of the junction box of FIG. 1 along the line 5-5 according to one example embodiment.

DETAILED DESCRIPTION OF EXEMPLARY EMBODIMENTS

FIG. 1 illustrates one example of a resistance temperature detector (RTD) 10 configured to have wire connections substantially sealed from the environment around it in a junction box 16, also referred to as a connector seal. RTD 10 includes stem 12, cable 14, and junction box 16. Stem 12 is the portion of RTD 10 that retrieves temperature measurements. Stem 12 includes probe 18 and fitting 20. Probe 18 is intended to provide fast responses of temperature changes. In the illustrated example embodiment, probe 18 is inserted into a subject of interest 21 in order to obtain temperature data from it. Probe 18 is retained within fitting 20 by an adhesive or fastening means. In one example embodiment, probe 18 may be retained within fitting 20 using glue. In other example embodiments, probe 18 may be retained by welding, soldering, or any other known means. In another example embodiment, probe 18 may be made of platinum, while in other example embodiments, probe 18 may be made of nickel, copper, or any other material suitable for retrieving temperature data.

Cable 14 is coupled to junction box 16 and stem 12 and both provides temperature data to a user interface, such as a central processing unit or the like, and provides power to stem 12. In one embodiment, cable 14 may be coupled to junction box 16 via a wire connector fitting. In other example embodiments, cable 14 may be coupled to junction box 16 using any national pipe thread connection or any other suitable means that fluidly seals the junction box 16.

Referring to FIG. 2, junction box 16 will be described in greater detail. Junction box 16 serves as a connector of stem 12 and cable 14 and well as a seal for enclosed wire terminals. The seal is intended to enable RTD 10 to remain within a medium, such as a fluid, with a reduced chance of the medium leaking into junction box 16. Junction box 16 generally includes body 22 and sleeve 24. Body 22 serves to physically and electrically couple stem 12 and cable 14 together. Body 22 includes terminal plate 28, fasteners 30, terminal block 32, connectors 34, and end plugs 36. Plate 28 serves as a base for block 32 to be fastened via fasteners 30 and abuts against sleeve 24 (as described in greater detail below).

Block 32 serves as a contact point for stem 12 and cable 14 to be coupled together. Wires from stem 12 and cable 14 are connected together by insertion into block 32 and making contact with connectors 34. In one example embodiment, block 32 may be made of a nylon material, while in other example embodiments, block 32 may be of any suitable materials that serves as an insulator or holds form in a wide temperature range. In another example embodiment, connectors 34 may be screws, while in other example embodiments, connectors 34 may be wire connectors or any other suitable fastening device.

End plugs 36 each define a through-hole 38, a channel 40, and a channel 42 and each include at least three O-rings 44, 46, and 48. Through-hole 38 receives and retains either stem 12 or cable 14 in a substantially sealed fashion. Channel 40 is configured to retain O-ring 44, which makes contact with sleeve 24 in order to maintain positioning of and to aid in substantially sealing sleeve 24. Channel 42 is configured to retain stacked O-rings 46 and 48. O-ring 46 is positioned as an internal O-ring while O-ring 48 is positioned in an external fashion around O-ring 46. O-ring 46 acts to bias O-ring 48 against sleeve 24 in order to form a substantial seal and to index the position of sleeve 24 as described below.

Sleeve 24 is a cylindrical section of material that is configured to substantially seal junction box 16 from an outside medium by compressing O-rings 44, 46, and 48. Sleeve 24 is configured to reciprocally slide between a first and second position. In on example embodiment, each of the first and second positions may correspond to an open position, where the wire connections to block 32 may be maintained, or a closed position, which is intended to substantially seal the wire connections. In another example embodiment, each of sleeve 24, plate 28, fasteners 30, connectors 34, end plugs 36 may be constructed of stainless steel. In other example embodiments, each of these components of junction box 16 may be made of any other metal or polymer material or combination thereof that is suitable for the tasks each component is intended to perform.

FIG. 3 illustrates a side view of junction box 16 and how the wires from stem 12 and cable 14 connect to block 32. Block 32 defines holes 50 that are configured to receive wires from each of stem 12 and cable 14 for connection via connectors 34. In the illustrated example embodiment, block 32 is fastened to plate 28 via fasteners 30, shown as bolts, which pass through plate 28. In another example embodiment, fasteners 30 may be screws, while in other embodiments fasteners 30 may be any other suitable fastening means such clips, adhesive, or the like.

FIG. 4 illustrates junction box 16 with sleeve 24 in the open position where the wire connections from stem 12 and cable 14 may be maintained. Each end of sleeve 24 defines a groove 54. These grooves receive O-rings 48. When sleeve 24 is in the open position, groove 54 receives O-Ring 48 in order to index and retain sleeve 24 in this open position. When sleeve 24 is in the closed position, O-ring 44 is compressed by the interior surface 56 of sleeve 24 and forms a seal 7 and groove 54 receives O-ring 48, which indexes the position of sleeve 24 and forms a substantial seal with interior surface 56 of sleeve 24 due to the compression created from the bias of O-ring 46.

FIG. 5 illustrates an cross-sectional end view of junction box 16 and how plate 28, fasteners 30, and block 32 are aligned within, sleeve 24. Plate 28 is configured to be tangential to sleeve 24. This abutment of plate 28 to sleeve 24 serves as a guide for sliding sleeve 24 between the open and closed positions. While the illustrated example embodiment shows that sleeve 24 is a cylindrical shape, in other embodiments, sleeve 24 may be prismatic, pyramidal, or any other suitable shape. Likewise, while plate 28, fastener 30, and block 32 are shown to have a specific shape in the illustrated embodiment, in other example embodiments, the RTD seal elements may be of any shape that facilitates the intended functionality. The plate 28 and block 32 may also be a single integral member fabricated by any suitable method such as injection molding.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature. Further, for purposes of this disclosure, the term "seal" means to prevent entry of a fluid into junction box 16 for a selected period of time.

The present disclosure has been described with reference to example embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A RTD connector seal to couple and seal an RTD device to an RTD cable, the RTD connector seal comprising:
   a tubular sleeve defining an annular groove in an interior surface proximate each end of the sleeve;
   a pair of end plugs, each end plug defining a first annular channel configured to receive an O-ring and a second annular channel configured to receive stacked O-rings, with one O-ring aligned with the annular groove in the sleeve, each end plug further defining a through hole configured to receive one of the RTD device and RTD cable;
   a terminal plate coupled to each end plug and configured to slidingly engage the interior surface of the sleeve; and
   a terminal block mounted on the terminal plate, wherein the RTD device is coupled to the RTD cable on the terminal block sealed within the sleeve.

2. The RTD connector seal of claim 1, wherein the terminal plate and terminal block are a single integral member.

3. The RTD connector seal of claim 1, wherein the through hole in each end plug is threaded.

4. The RTD connector seal of claim 1, wherein one of the stacked O-rings exerts a biasing force to index another of the stacked O-rings in one of the annular grooves as the tubular sleeve is moved.

5. The RTD connector seal of claim 1, wherein the tubular sleeve is configured to move from a first position to a second position, the first position fluidly seals the volume between the two end plugs and the second position exposes the terminal block.

6. The RTD connector seal of claim 5, wherein the second position is one of proximate the RTD device and proximate the RTD cable.

7. An apparatus to fluidly seal a terminal connection of an RTD device and an RTD cable, the apparatus comprising:
   a tubular sleeve including an interior surface, the sleeve having a first end and a second end, and a groove defined in the interior surface proximate each of the first and second ends;
   a first plug disposed in the first end and a second plug disposed in the second end, with each plug configured to support a plurality of seals, wherein at least one seal on each plug engages the groove at each respective end of the sleeve and at least one seal on each plug fluidly seals the plug against the interior surface of the sleeve; and
   a terminal member disposed inside the sleeve between and coupled to the first and second plug and in contact with the interior surface of the sleeve, with the terminal member configured to couple the RTD device and the RTD cable together, and wherein the terminal member guides the sleeve as the sleeve moves to expose the terminal member.

8. The apparatus of claim 7, wherein the terminal member includes a terminal plate and a terminal block.

9. The apparatus of claim 7, wherein each of the first plug and second plug defines a through hole configured to receive one of the RTD device and RTD cable.

10. The apparatus of claim 9, wherein the through hole in each plug is threaded.

11. The apparatus of claim 7, wherein the tubular sleeve is configured to move from a first position to a second position, the first position fluidly seals the volume between the two plugs and the second position exposes the terminal member.

12. The apparatus of claim 11, wherein the second position is one of proximate the RTD device and proximate the RTD cable.

13. The apparatus of claim 7, wherein the seals are O-rings.

14. The apparatus of claim 13, wherein at least two of the O-rings on each plug are stacked.

15. The apparatus of claim 14, wherein one of the stacked O-rings exerts a biasing force to index another of the stacked O-rings in one of the grooves in the interior surface as the tubular sleeve is moved.

16. A method of connecting an RTD device to an RTD cable in a RTD junction box, the junction box including a slidable sleeve and a terminal member, for submersion in a fluid, the method comprising the steps of:
   coupling the RTD device to the junction box;
   coupling the RTD cable to the junction box;
   moving the slidable sleeve from a first position to a second position indexed by an O-ring inserting into an annular groove defined in an interior surface of the sleeve, wherein the terminal member is exposed;
   attaching the RTD device and RTD cable to each other on the terminal member;
   moving the slidable sleeve to the first position indexed by the O-ring inserting into another annular groove defined a spaced distance from the other annular groove in the interior surface of the sleeve; wherein at least two other O-rings fluidly seal the terminal member inside the sleeve.

17. The method of claim 16, wherein the second position is one of towards the RTD device and the RTD cable.

18. The method of claim 16, wherein the O-ring inserted in the groove is one of two stacked O-rings, with the other stacked O-ring exerting a biasing force on the other O-ring.

19. The method of claim 16, wherein the O-ring that fluidly seals the terminal member is positioned a spaced distance from the stacked O-rings and seals against the interior surface of the sleeve.

20. The method of claim 19, the terminal block is sealed within the sleeve between two sets of stacked O-rings and the two O-rings that seal against the interior surface of the sleeve.

* * * * *